Dec. 31, 1968     D. P. RIEDEL     3,419,215
MOBILE HOME HEATING SYSTEM
Filed Sept. 28, 1966     Sheet 1 of 3
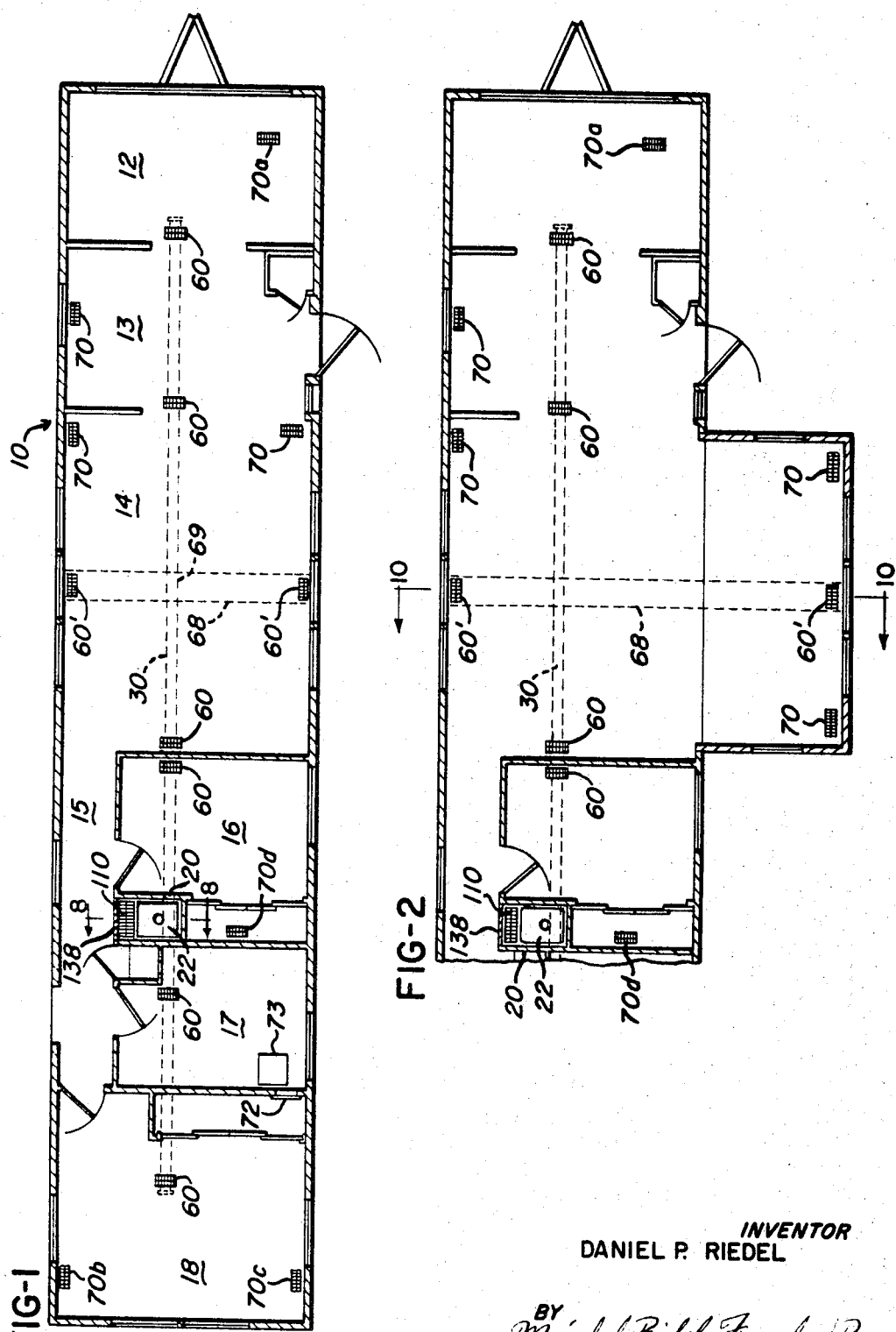
INVENTOR
DANIEL P. RIEDEL
BY *Maréchal, Biebel, French & Bugg*
ATTORNEYS

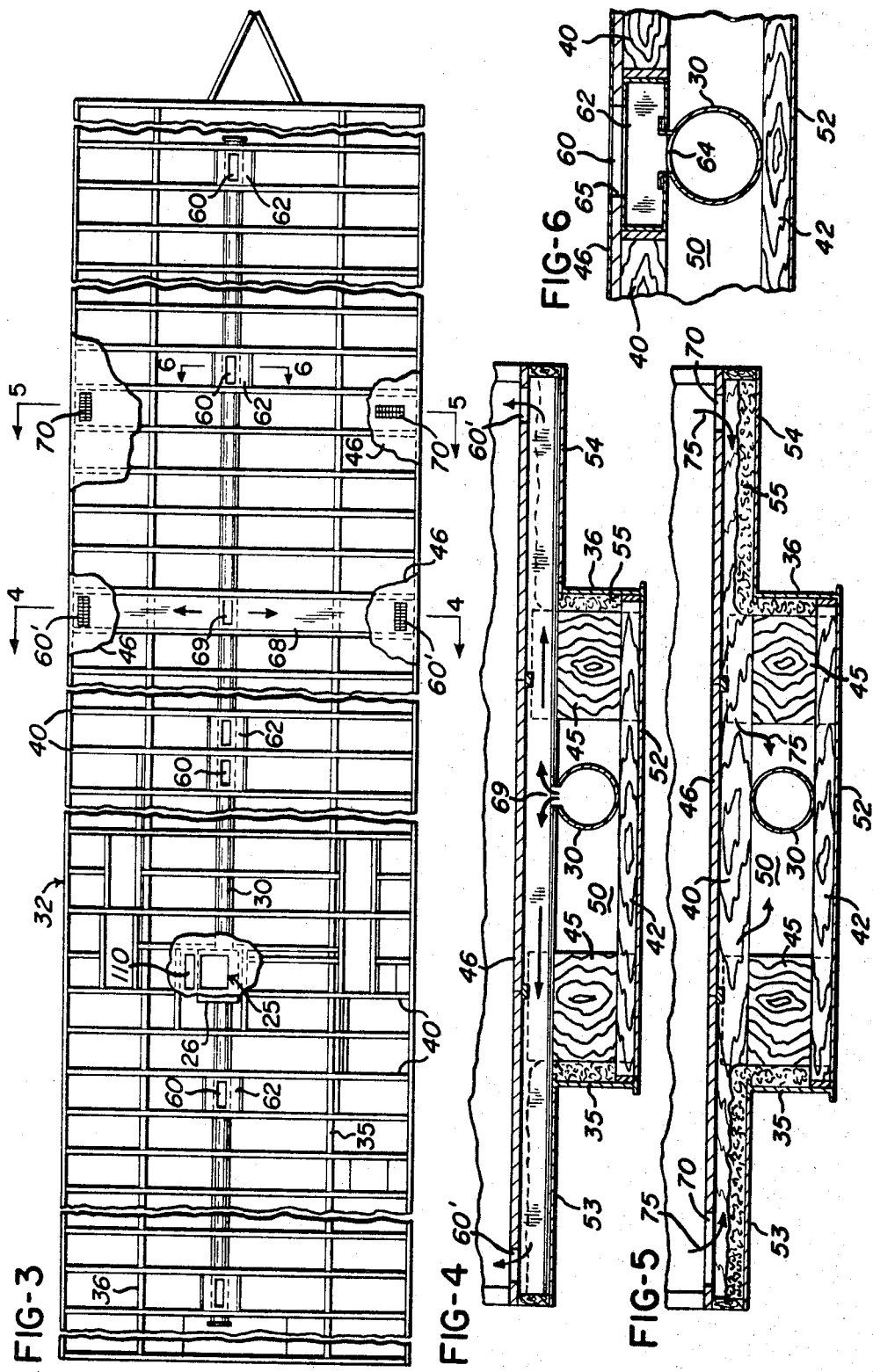

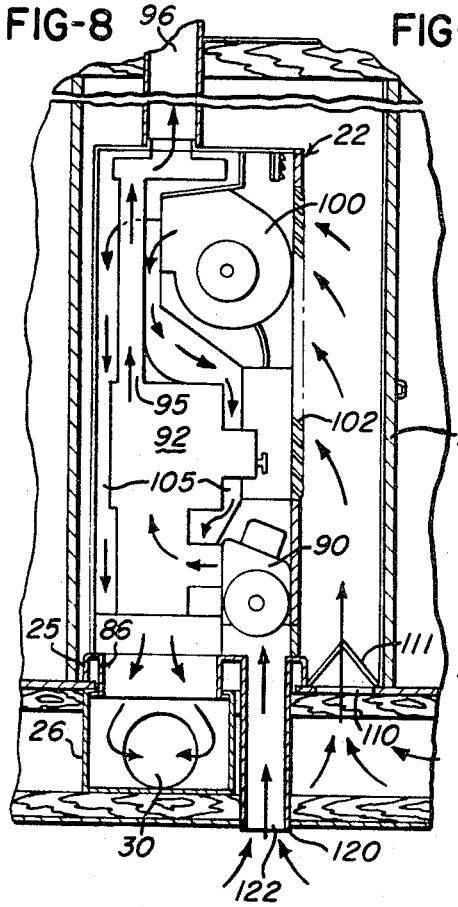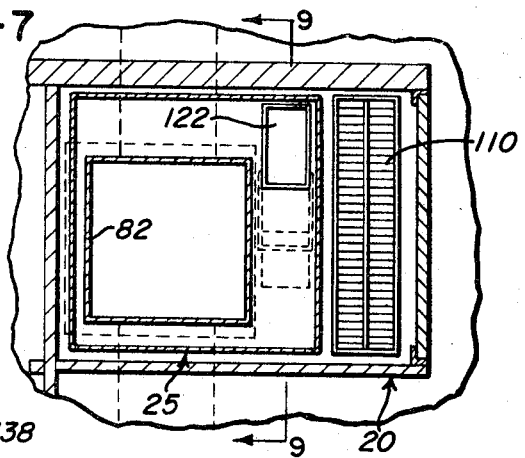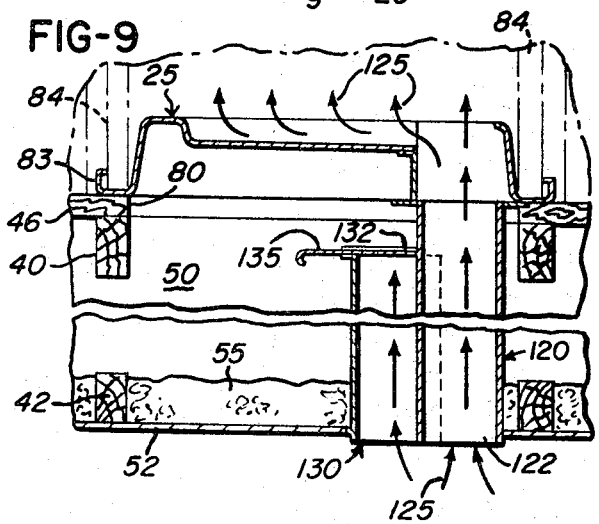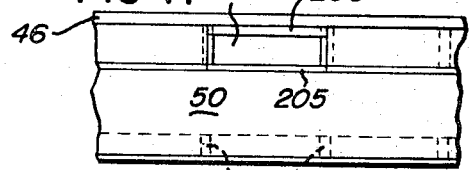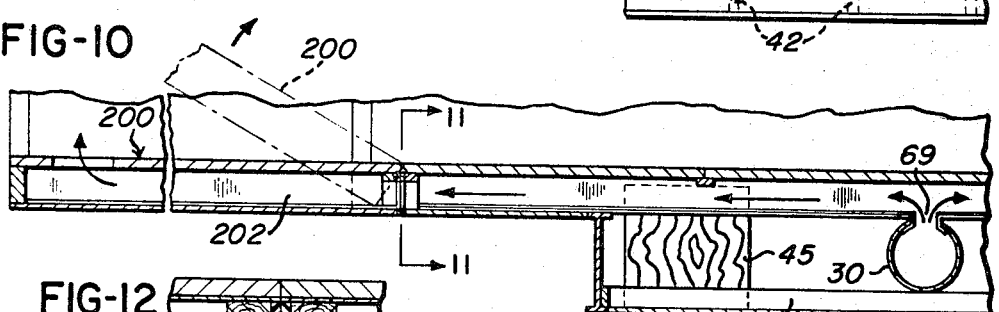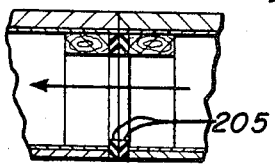

3,419,215
MOBILE HOME HEATING SYSTEM
Daniel P. Riedel, Brookville, Ohio, assignor to Vindale Corporation, Brookville, Ohio, a corporation of Ohio
Filed Sept. 28, 1966, Ser. No. 582,737
10 Claims. (Cl. 237—28)

ABSTRACT OF THE DISCLOSURE

A heating system for mobile homes in which a furnace is sound-isolated from the interior of the home by being positioned within a substantially air-tight closet. The heater directs heated air downwardly into a plenum chamber for flow through conduits in an enclosed basement. Cold air registers in the floor open into the basement. A cold air return opening is formed in the closet in front of the heater and admits return air from the basement into the heater. Cold air registers are positioned in the clothes closets to prevent dampness. The basement return air circulation prevents freezing of the pipes, and maintains a dry basement area. Combustion air is admitted into the furnace through an enclosed inlet passageway, and outside air may be admitted into the basement through another passageway. The system results in a slightly pressurized home interior to reduce drafts and air leaks at doors and windows.

---

This invention relates to heating systems for mobile homes and more particularly to forced air circulating systems in mobile homes.

It is an object of this invention to provide a heating and cooling system which provides a more uniform distribution of heat throughout the mobile home.

A further object of this invention is the provision of a forced air heating and cooling system for a mobile home in which a generally enclosed basement area is utilized for the cold air return passageway to the heater.

A still further object of this invention is the provision of a mobile home heating and cooling system in which a hot air furnace or air conditioner is enclosed within a substantially sound proof and air tight closet formed within the mobile home.

A still further object of this invention is the provision of a mobile home forced air circulating system in which the furnace is enclosed within a substantially air-tight closet and is sound-isolated from the remainder of the mobile home, and in which the furnace draws its return air from a substantially enclosed basement extending longitudinally substantially the length of such home beneath the flooring.

A more specific object of this invention is the provision of a mobile home heating system in which a furnace is mounted in superimposed relation to a floor opening for directing heated air downwardly into such opening and into a longitudinally aligned hot air conduit or duct, and in which a further opening is provided in the floor in front of one wall of the furnace for admitting return air into the interior of the furnace for recirculation throughout the mobile home.

These and other objects and advantages of the present invention will be apparent from the following description, the accompanying drawings and the appended claims.

In the drawings:

FIG. 1 is a somewhat diagrammatic plan view showing a floor plan of a mobile home having a heating system constructed according to this invention;

FIG. 2 shows the heating system of this invention as applied to an expandable type of mobile home;

FIG. 3 is a somewhat diagrammatic and partially broken away plan view of a mobile home underframe construction employed with the homes of FIGS. 1 and 2 to which the circulating system of this invention is applied;

FIG. 4 is a transverse section taken generally along the line 4—4 of FIG. 3;

FIG. 5 is a further transverse section taken generally along the line 5—5 of FIG. 3;

FIG. 6 is a fragmentary transverse section through one of the hot air outlets taken generally along the line 6—6 of FIG. 3;

FIG. 7 is an enlarged horizontal section through the furnace closet and furnace base, with the furnace removed, also showing the cold air return inlet for the furnace;

FIG. 8 is a vertical section through the furnace closet showing somewhat diagrammatically the details of a typical hot air circulating air furnace which may be used with this invention;

FIG. 9 is an enlarged vertical section through the furnace base taken generally along the line 9—9 of FIG. 7;

FIG. 10 is an enlarged transverse fragmentary section through a portion of the flooring of the expandable type home taken generally along the line 10—10 of FIG. 2;

FIG. 11 is an enlarged end view looking into the edge of the frame of the expandable model taken generally along the line 11—11 of FIG. 10; and FIG. 12 is an enlarged fragmentary portion of FIG. 10 showing the air duct joint between the fixed and the expanding floor portions.

Referring to the figures of the drawing which illustrate a preferred embodiment of the invention, a floor plan showing a mobile home 10 constructed according to this invention is shown in FIG. 1, with further details of the frame assembly being shown in FIGS. 3–6. The mobile home 10 of FIG. 1 is shown with a representative floor plan including a dining room area 12 on the front end, adjoined with a kitchen area 13 which in turn opens into a living room area 14. A hallway 15 extending down one side of the home opens into a first bedroom 16, a bathroom 17, and a master bedroom 18. Since such mobile homes are designed for transport over the highways, they have a width up to twelve feet wide under present regulations, but may have a length of up to 60 feet or more. Accordingly, such homes are frequently five times longer than they are wide, and therefore pose peculiar problems in providing for uniform heat throughout without cold pockets and drafts. Also, since the furnace occupies an area or space within the mobile home, it is important that the heating system be relatively silent in operation.

These objects and advantages are met in the present invention by the provision of a heating system including an enclosed closet indicated generally at 20 in FIG. 1 within which is received a forced hot air furnace 22. The furnace 22 may burn fuel oil, bottled gas or the like. It is mounted on a furnace base shown generally at 25 in FIG. 3, and directs heated air downwardly through the base 25 and into a sheet metal plenum chamber 26 (FIG. 8) for delivery through a longitudinally extending main heat trunk or conduit 30 (FIG. 3). The conduit 30 extends substantially the length of the mobile home, and is positioned and supported within a basement-type frame 32.

The frame 32 is preferably constructed according to the teachings of the patent of Steck, 3,254,914, issued June 7, 1966 and assigned to the same assignee as this invention. Only so much of the details of the underframe construction are repeated here as is necessary for a complete and full understanding of the present invention. Referring to FIGS. 3–6, it will be seen that the frame shown herein, for the purpose of the description of the preferred embodiment of this invention, is of the outrigger type including a pair of parallel, spaced-apart I-beams 35 and 36, running the length of the underframe construction. There are supported on the upper surface of such I-beams a plurality of transversely aligned floor joists 40. The joists 40 are preferably two-by-fours which have their lower edges resting on the top surfaces of the I-beams and which extend transversely outwardly beyond the I-beams to form the outrigger frame construction.

The frame 32 also preferably includes a plurality of smaller cross or tie members 42. The members 42 are received within the dimensions of the I-beams and have their opposite ends preferably resting on the lower, inwardly-directed flanges of the I-beams 35 and 36. The cross members 42 are preferably, but need not necessarily, be equal in number to the joists 40 and are each preferably positioned under a joist and form thrust-transmitting connections with the respective I-beams 35 and 36.

The frame construction preferably includes a plurality of rigid connections extending between the joists 40 and the cross members 42 in the form of generally rectangularly-shaped gusset plates 45. The gusset plates 45 each have their upper ends rigidly connected to one of the joists 40 and are, in turn, connected at their lower ends to the cross members 42, thus forming a rigid box-like frame construction. The gusset plates 45 transmit the load from the flooring 46 and from the joists 40 to the cross members 42, which in turn transmit loads to the bottom edges of the I-beams 35 and 36. The flooring 46 is preferably formed as a sheet of plywood which is nailed, stapled, or otherwise secured to the top surfaces of the joists 40.

The construction accordingly is one which defines therein a longitudinally open space or basement 50 extending substantially the length of the frame 32 and being generally unobstructed transversely between the gusset plates 45. The basement 50 is partially enclosed on the sides by the I-beams 36. Non-warping sheet material 52 may be formed between the bottoms of the I-beams and supported on the bottom surfaces of the cross members 42 for closing the bottom of the basement 50. Additionally, similar material at 53 and 54 is employed for closing the outrigger portions of the frame thereby forming an enclosed basement space which extends substantially the length of the frame 32 and which is substantially air tight. Insulating batting 55 may be placed in the basement over the inside surfaces of the material 53 and 54. The longitudinally extending hot air conduit 30 is placed between the joists 40 and the bottom cross members 42 within the basement 50 substantially as shown in FIGS. 4, 5, and 6.

As shown in FIGS. 1 and 3, the floor 46 is provided with a plurality of hot registers or outlets 60 which open into the duct 30. The hot air outlets 60 are shown in greater detail in FIG. 6 as each including a small sheet metal plenum box 62 which is positioned over an opening 64 formed in the duct 30. There is, in turn, an opening 65 cut into the flooring 46 in alignment with the box 62. The opening formed in the top of the small plenum box 62 may be conveniently cut out at the same time that the floor opening 65 is cut out.

As shown in FIGS. 1 and 3, the hot air outlets 60 are positioned longitudinally through the length of the mobile home coinciding with the transverse position of the duct 30. For the purpose of providing additional heating in the living room area 14, there may be provided a transversely oriented hot air duct 68 which joins with the main duct 30 at an opening 69 and which, in turn, terminates in hot air outlets 60′ located adjacent the opposite living room walls.

The flooring 46 also includes means defining a plurality of cold air return openings 70 which are positioned generally peripherally around the home and adjacent the side walls of the home, in transversely spaced relation to the hot air openings 60. The cold air return openings are, as shown in FIG. 3, positioned between adjacent pairs of the transversely oriented joists 40, and open directly into the basement area 50. As shown in FIG. 1, the cold air return openings 70 are placed to remove drafts or stagnant air, there being an opening 70a positioned beneath the front window in the dining area 12, and a pair of openings 70b and 70c positioned in the opposite corners of the master bedroom 18.

A particular feature of this invention is the provision of a return opening 70d within or in access to the clothes closets, there being one such return opening 70d in the floor of the closet of the bedroom 16. The master bedroom 18 is formed with an opening 72 formed in the back wall of the closet which opens, in the completed home, just under the front end of a tub (not shown) in the bathroom 17. The front end of the tub covers an enlarged plumbing access hole 73 which, in turn, doubles as a further cold air return duct, with the result that cold return air is drawn through the closet opening 72 and into the basement 50 through the plumbing access hole 73.

The return air thus admitted through the openings 70 and 73, as defined above, flows inwardly as shown by the arrows 75 in FIG. 5 in the open spaces between the joists 70 and into the central portion of the basement 50.

The details of the closet 20 and the furnace 22 are shown in FIGS. 7, 8 and 9. A hot air access opening 80 (FIG. 9) is formed in the flooring 46 beneath the furnace 22. The opening 80 is in substantial alignment with a corresponding opening 82 formed in the furnace base 25 and with the hot air plenum 26. The base 25 is formed with peripherally upwardly turned flanges 83 (FIG. 9) in which the side walls 84 of the furnace are received. The furnace includes a sheet metal adapter duct 86 which extends from the furnace downwardly through the openings 80 and 82 formed in the base in the flooring and into the interior of the plenum 26 as shown in FIG. 8.

The furnace 22 may include a typical pressure-type gun oil burner 90 which discharges into a fire box 92, and the flue gases pass upwardly through a flue gas duct 95 through the top of the furnace 22 and into a suitable flue pipe 96 out the top of the mobile home for discharge. The furnace 22 similarly may include a centrifugal blower 100 which receives inlet air through a louvered front wall 102 of the furnace. A suitable filter (not shown) may be positioned just inwardly of the front wall 102. This air is then directed downwardly in surrounding relation to the firebox 92, by a surrounding air duct as shown at 105, and is heated and discharged through the bottom of the furnace.

Return air is brought by the blower 100 from the basement area 50 through an opening 110 formed in the floor 46 within the heater closet 20 immediately in front of the furnace wall 102. The opening 110 is covered by a screen 111 as shown in FIGS. 7 and 8. The cold return air which flows through the basement area 50 accordingly enters the furnace compartment or closet 20 through the cold air return opening 110 for flow into the louvered front wall 102 of the furnace 22.

The furnace base 25 includes means forming a depending sheet metal air inlet portion 120 (FIG. 9) which extends downwardly through the basement 50 and opens into the atmosphere beneath the frame 32. The portion 120 is divided into two parts. A first part forms a furnace air inlet passageway 122 which extends from the base 25 downwardly through the bottom of the mobile home through a suitable opening formed in the lower cover member 52. Air enters through the passageway 122 as indicated by the arrows 125 and flows into the burner 90. In this manner, the furnace draws outside air for combustion.

The base portion 120 further defines a second passageway 130 which terminates below the level of the floor 46 and forms a discharge opening 132 for admitting outside air into the basement 50 for mixing with the cold return air in the basement. The area of the opening 132 is regulated by means of a slide member 135 by which the amount of outside air admitted into the basement may be adjusted.

The closet 20 is preferably formed with a removable front closure wall 138 through which access may be obtained to the furnace 22. Since the interior of the closet 20 will be operating at a lower than atmospheric pressure, it is important that the fire box 92 and the external flue pipe 96 be air tight. It is also important that the cold air return opening 110 in the floor 46 positioned inwardly of the closet 20 and inwardly of the removable front wall 138 be of sufficient size to permit relatively free and unrestricted circulation by the blower 100. For example, with furnaces of 50,000 to 75,000 B.t.u. per hour capacity, it has been found that an opening 110 having 210 square inches is satisfactory. The closet walls which contain the furnace 22 may be lined with a suitable fire-proof wall board for both sound and fire-proofing.

It has also been found desirable to employ fewer return air openings 70 than there are hot air outlets 60, so that the interior of the mobile home is slightly pressurized. The fresh air basement inlet 132 tends to reduce excess humidity.

The invention may also be applied to an expandable type of home, typically illustrated in FIGS. 2, 10, 11 and 12, where like reference numerals are used to represent like parts. Here, a fold-out floor section 200 may be lowered to a horizontal position, as shown generally in FIG. 10, to form a continuation of the flooring 46 in the main mobile home section. The section 200 may be provided with a hot air duct 202 which forms, in effect, a continuation of the transverse duct 68. A substantially air-tight joint may be achieved by the use of foam rubber gaskets 205 between the abutting floor sections, as shown in FIG. 12. The fold-out floor section 200 may be similarly provided with a pair of cold air return ducts 70, as shown in FIG. 2, which communicate with the basement area 50 by flow through the transverse spaces between the floor joists.

It will be seen that the hot air circulating and heating system of this invention has some unique advantages. Since cold return air is constantly drawn through the basement area 50, the basement tends to remain dry. Also, the basement 50 is effectively made a part of the heat circulating system, and since it is preferably insulated fully across its bottom, the pipes and other conduits which may conveniently be contained therein, such as the pipes and drains from the sinks and tubs, are protected from freezing in cold weather. Further, since the cold air return is through the conduit or passageways formed by the basement itself, and since the enclosed close 20 effectively seals and isolates the hot air furnace 22 from the remaining structure, there is no need for forming the bedroom and closet doors with the usual large air clearance spaces at the bottom. The employment of a fewer number of return air openings 70 in the floor in combination with the passageway 130 for admitting outside air into the return air system effectively prevents the accumulation of excessive moisture within the mobile home and also tends to pressurize the interior of the mobile home with respect to the outside or ambient air pressure. This effectively reduces drafts and annoying air leakages at doors and windows.

While the preferred embodiment herein has been described in connection with a basement type frame as shown and claimed in U.S. Patent No. 3,254,914, it is to be understood that the invention is not limited thereto, and may be applied to any mobile home in which there is a generally open area beneath the floor sufficient to provide an enclosed space forming a return air passageway for the several return air floor openings 70. Also, furnaces and air conditioning systems may be used within the closet 20 which differ in structural details from the furnace shown herein, and some of such furnaces may draw their combustion air through the ceiling rather than through the floor without departing from the scope of this invention.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. An improved forced circulating air heating system for a mobile home having a supporting frame and side walls comprising, a floor on said frame, a basement positioned beneath said floor and forming an enclosed space with said floor longitudinally extending substantially the length of said frame, means in said home defining a relatively air-tight closet, a forced air heater positioned in said closet and extending above the level of said floor, said heater having a blower and having a front wall defining a cold air inlet to said blower and further having a bottom opening, said blower being adapted to pull air thereinto through said cold air inlet for heating and for forcing the heater air out of said bottom opening thereof, means in said frame defining a plenum chamber positioned to receive heated air from said heater, a longitudinally extending heat conduit in said basement opening into said chamber and extending substantially the length of said frame and having means defining hot air outlets opening through said floor and into the interior of said mobile home generally centrally positioned transversely of the width of said home, means in said floor defining a plurality of cold air return openings positioned generally peripherally of said floor adjacent the side walls of said home transversely spaced from said hot air outlets and communicating directly with the interior of said basement for the return of cold air into said basement, and means in said floor defining an air return opening positioned within said closet and adjacent said heater front wall communicating with said basement and having an effective size related to the capacity of said heater so as to provide relatively free and unrestricted flow of return air from said basement into said heater cold air inlet.

2. The heating system of claim 1 further comprising means admitting a controlled amount of outside air into said basement for mixing with said return air for slightly pressurizing said home.

3. The heating system of claim 1 in which at least one of said cold air return openings is positioned within a clothes closet to provide for the circulation of air through clothing stored in such closet.

4. The heating system of claim 1 in which the number of hot air outlets exceed the number of cold air return openings.

5. The heating system for a mobile home having a frame forming an enclosed basement extending longitudinally substantially the length of said home and a floor supported in superimposed relation to said basement, comprising a forced hot air heater supported on said floor, said heater having a blower and having means defining a cold air inlet to said blower and a bottom hot air outlet, a substantially air-tight closet surrounding said heater with said cold air inlet opening into the interior of said closet, said floor having an opening communicating with said bottom outlet, longitudinally extending heat duct means in said basement communicating with said air outlet through said floor opening, a plurality of hot air registers in said floor opening into said duct for applying heated air into the interior of said home, a plurality of cold air registers in said floor opening into said basement, and means in said floor defining a cold air return opening positioned within said closet and having an effective size related to the capacity of said heater so as to provide relatively free and unrestricted flow of cold return air from said basement into said heater inlet.

6. The heating system of claim 5 further comprising a pan on said floor beneath said heater having a depending air inlet portion defining a first passageway extending through said basement and opening into the atmosphere outside of said basement and communicating with the interior of said heater for admitting air into the heater burner and further having a second passageway opening into the atmosphere and terminating in said basement for mixing outside air with the cold air return in said basement.

7. The heating system of claim 6 further comprising means in said second passageway for adjusting the amount of outside air admitted into said basement.

8. The heating system of claim 5 further comprising pan means in underlying relation to said furnace and having means defining a depending air inlet passageway extending through said basement and opening into the atmosphere on the one end and communicating with the interior of said heater on the other end for admitting combustion air into said heater.

9. The heating system of claim 5 further comprising means defining a passageway opening at one end into the atmosphere exteriorly of said basement and opening at its other end into the interior of said basement for admitting outside air for mixture with the air return in said basement.

10. The heating system of claim 5 in which said heater has a front wall and in which said cold air inlet is formed in said heater front wall, and in which said cold air return opening within said closet is positioned adjacent said heater front wall.

References Cited

UNITED STATES PATENTS

| 2,225,244 | 12/1940 | Anderson | 237—69 |
| 2,417,463 | 3/1947 | Anderson | 237—43 |
| 2,595,613 | 5/1952 | Spencer. | |

EDWARD J. MICHAEL, *Primary Examiner.*